US 6,736,228 B2

(12) United States Patent
Donohue et al.

(10) Patent No.: US 6,736,228 B2
(45) Date of Patent: May 18, 2004

(54) ELECTRIC MACHINE WITH INTEGRATED WET CLUTCHES

(75) Inventors: William P. Donohue, Milford, MI (US); Greg Smith, Canton, MI (US); Jeffrey J. Brautigan, Livonia, MI (US); Mark L. Hopper, Ypsilanti, MI (US); Marci Smith, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/997,644

(22) Filed: Nov. 29, 2001

(65) Prior Publication Data

US 2003/0098189 A1 May 29, 2003

(51) Int. Cl.$^7$ ................................................ B60K 1/00
(52) U.S. Cl. .......................... 180/65.4; 180/65.2; 475/5
(58) Field of Search ................................ 180/65.1, 65.2, 180/65.3, 65.4, 65.5, 65.7, 306, 337; 123/559.3, 192.1; 192/70.12, 87.11; 475/72, 76, 80, 5

(56) References Cited

U.S. PATENT DOCUMENTS

| | | | |
|---|---|---|---|
| 4,416,360 A | 11/1983 | Fiala | |
| 5,513,719 A | 5/1996 | Moroto et al. | |
| 5,600,191 A | 2/1997 | Yang | |
| 5,643,121 A * | 7/1997 | Greenwood et al. | 475/72 |
| 5,755,302 A | 5/1998 | Lutz et al. | |
| 5,773,904 A | 6/1998 | Schiebold et al. | |
| 5,788,037 A * | 8/1998 | Forsyth et al. | 192/70.12 |
| 5,823,281 A | 10/1998 | Yamaguchi et al. | |
| RE36,678 E | 5/2000 | Moroto et al. | |
| 6,149,544 A | 11/2000 | Masberg et al. | |
| 6,158,405 A | 12/2000 | Masberg et al. | |
| 6,176,807 B1 | 1/2001 | Oba et al. | |
| 6,177,734 B1 | 1/2001 | Masberg et al. | |
| 6,208,036 B1 * | 3/2001 | Evans et al. | 180/65.2 |
| 6,258,001 B1 | 7/2001 | Wakuta et al. | |
| 6,289,882 B1 * | 9/2001 | Slicker | 123/559.3 |
| 6,340,339 B1 * | 1/2002 | Tabata et al. | 180/65.2 |
| 6,345,216 B1 * | 2/2002 | Morimoto et al. | 180/337 |
| 6,354,974 B1 * | 3/2002 | Kozarekar | 180/65.2 |
| 6,364,807 B1 * | 4/2002 | Koneda et al. | 180/65.2 |
| 6,365,983 B1 * | 4/2002 | Masberg et al. | 290/40 C |
| 6,371,877 B1 * | 4/2002 | Schroeder et al. | 475/5 |
| 6,487,998 B1 * | 12/2002 | Masberg et al. | 123/192.1 |
| 6,491,149 B1 * | 12/2002 | Kundermann et al. | 192/87.11 |

FOREIGN PATENT DOCUMENTS

| | | |
|---|---|---|
| EP | 0528412 A1 | 2/1993 |
| EP | 1225370 A2 | 7/2002 |

* cited by examiner

Primary Examiner—Brian L. Johnson
Assistant Examiner—Hau Phan
(74) Attorney, Agent, or Firm—Brinks Hofer Gilson & Lione

(57) ABSTRACT

A powertrain for a hybrid vehicle includes an engine, a transmission and an electric machine disposed therebetween. The electric machine includes a stator housing, a stator mounted within the stator housing and a rotor mounted radially within and coaxial with the stator. The electric machine further includes a first clutch disposed between the engine and the rotor, and a second clutch disposed between the rotor and the transmission. The first and second clutches include non-ferrous clutch plates which are adapted to be immersed in hydraulic fluid. The electric machine has a first mode wherein the electric machine provides torque to the engine, a second mode wherein the electric machine is driven by the engine and a third mode wherein the electric machine provides torque to the transmission. The first and second clutches are positioned radially within the stator housing and axially within the length of the stator housing.

15 Claims, 2 Drawing Sheets

ELECTRIC MACHINE WITH INTEGRATED WET CLUTCHES

TECHNICAL FIELD OF THE INVENTION

The present invention generally relates to a powertrain for a hybrid vehicle.

BACKGROUND OF THE INVENTION

Electric machines are often used in hybrid vehicles. A hybrid vehicle includes a typical gasoline powered engine, but also includes an electric motor which can be used to provide additional torque to the transmission to allow the vehicle to operate under the power of the gasoline engine, the electric motor, or under power of both the gasoline engine and the electric motor. Typically electric motors include a stator and a rotor. Clutches are arranged within the electric machine to provide selective engagement of the electric machine with the engine and transmission of the hybrid vehicle. Problems with these electric machines include over-heating and debris getting caught within the electric machine. Typically, ferrous clutch plates are used within the clutches. Ferrous clutch plates produce ferrous dust as they wear. The ferrous dust would be drawn to the magnets within the stator and rotor and would get caught in the air gap between the stator and rotor. If the magnets within the stator and the rotor reach a temperature above 180 degrees Celsius, then the magnets will de-guass, and the electric machine will not function properly. Therefore, there is a need for an electric machine for a hybrid vehicle powertrain.

DETAILED DESCRIPTION OF THE INVENTION

The following description of the preferred embodiment of the invention is not intended to limit the scope of the invention to this preferred embodiment, but rather to enable any person skilled in the art to make and use the invention.

Figure 1:
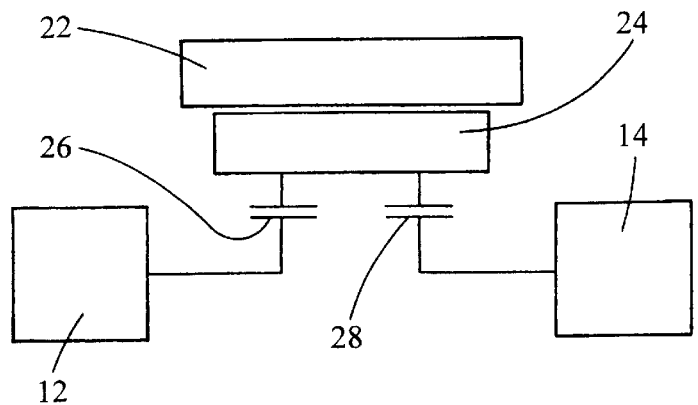
FIG. 1 is a schematic of a powertrain utilizing an electric machine of the present invention.
Figure 2:
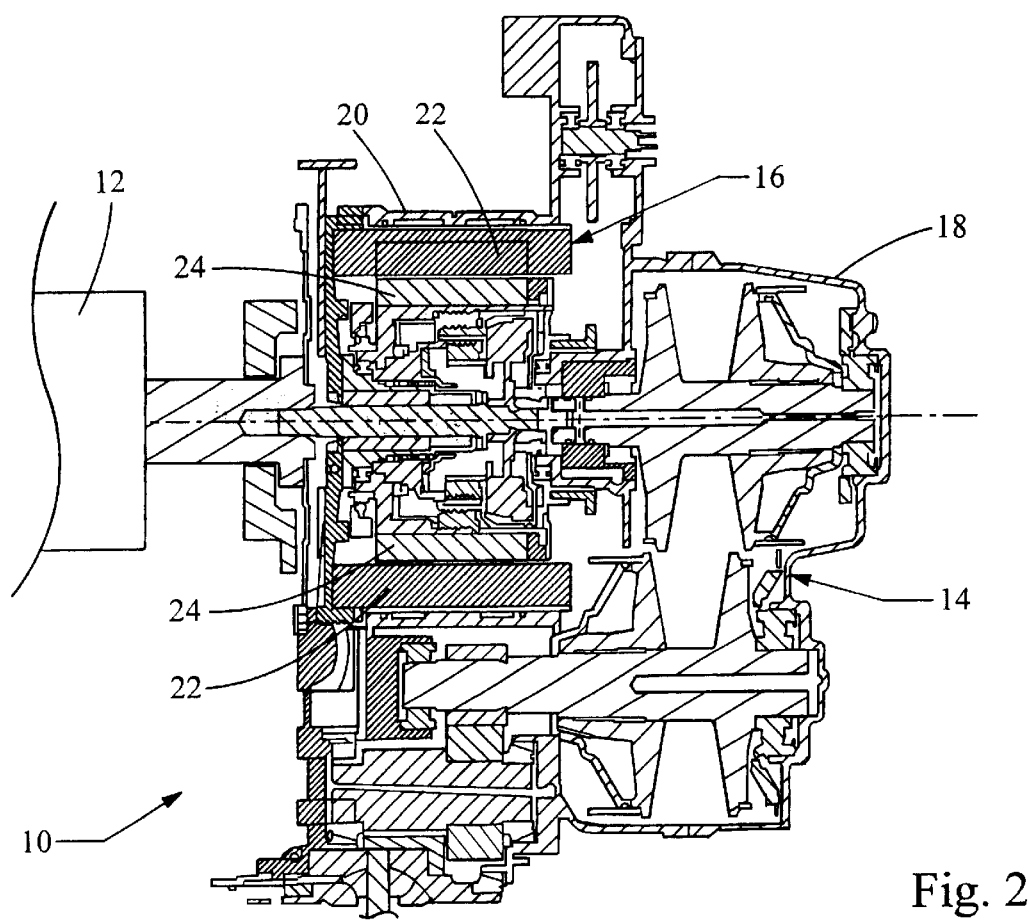
FIG. 2 is a sectional view of a powertrain utilizing an electric machine of the present invention.

Referring to FIGS. 1 and 2, a schematic of a powertrain for a hybrid vehicle is shown generally at 10 in FIG. 1, and a sectional view of the powertrain 10 is shown in FIG. 2. The powertrain 10 includes an engine 12 and a transmission 14. Preferably, the engine 12 is an internal combustion engine, and the transmission 14 is of the type typically used in conjunction with an internal combustion engine. An electric machine 16 is mounted between the engine 12 and the transmission 14. Preferably, the electric machine 16 is mounted within a housing 18 of the transmission 14 to keep the electric machine 16 free of contamination and to facilitate compact packaging. Preferably, and as shown in the Figures, the transmission 14 is a continuously variable type transmission, however, the electric machine 16 of the present invention could be used with other types of transmissions as well.

Figure 3:
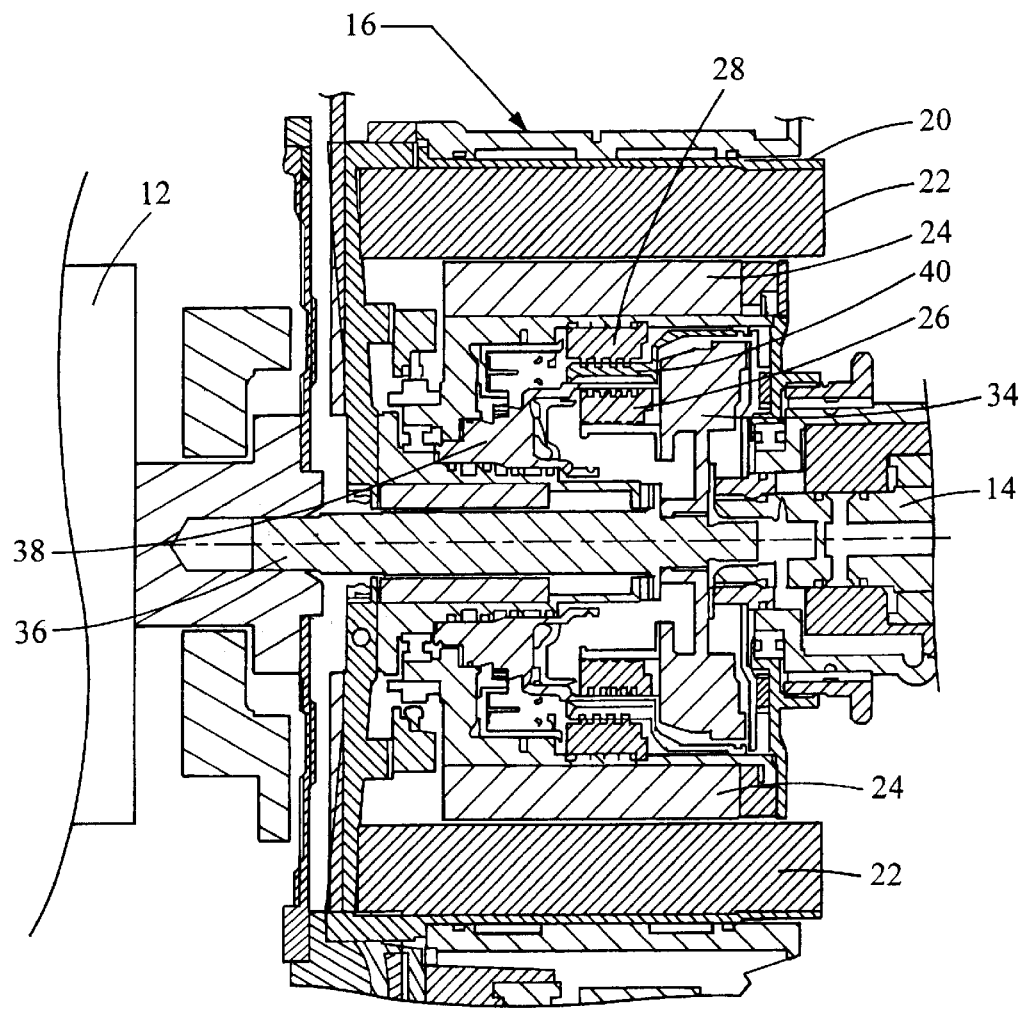
FIG. 3 is a close up view of a portion of FIG. 1.

Referring to FIG. 3, the electric machine 16 includes a stator housing 20 and a stator 22 mounted within the stator housing 20. A rotor 24 is mounted radially within and coaxial with the stator 22. A first clutch 26 is disposed between and interconnects the engine 12 to the rotor 24. The first clutch 26 provides a direct connection between the engine 12 and the rotor 24 such that rotational movement from the engine 12 can be directly transferred to the rotor 24. The use of the first clutch 26 in this way eliminates the need for additional components to facilitate selective engagement of the engine 12 to the rotor 24. A second clutch 28 is disposed between and interconnects the rotor 24 to the transmission 14. The second clutch 28 provides a direct connection between the rotor 24 and the transmission 14 such that rotational movement from the rotor 24 can be directly transferred to the transmission 14. The use of the second clutch 28 in this way eliminates the need for additional components to facilitate selective engagement of the rotor 24 to the transmission 14.

Preferably, the first and second clutches 26, 28 include non-ferrous clutch plates which are adapted to be immersed in hydraulic fluid. Non-ferrous clutch plates have paper or some other suitable friction material rather than a ferrous material. Non-ferrous clutch plates allow the electric machine 16 to be designed to be immersed within hydraulic fluid which will wash away debris within the clutches 26, 28 thereby improving the long term performance of the clutches 26, 28. The hydraulic fluid will act as a coolant to keep the stator 22 and the rotor 24 cooled below 180 degrees Celsius.

The electric machine 16 has a first mode of operation as a starter, wherein the electric machine 16 provides torque to the engine 12 to start the engine 12. In the first mode, the vehicle is not running, and electric energy from the vehicle's battery is fed to the electric machine 16 which acts as an electric motor to provide torque to the crankshaft of the engine 12 to start the engine 12. To operate the electric machine 16 in the first mode, the first clutch 26 is engaged, thereby connecting the engine 12 to the rotor 24 and an electric current is provided to the electric machine 16, thereby causing the electric machine 16 to produce torque which is then transferred through the first clutch 26 to the engine 12.

Once the vehicle is started, the electric machine 16 has a second mode of operation as a generator. The engine 12 provides torque to the electric machine 16, thereby causing the electric machine 16 to generate electric current. In the second mode, the electric machine 16 is used like an alternator to provide electric current to power electrical instruments within the vehicle and to provide a current to charge the vehicle's battery while the engine 12 is running. To operate the electric machine 12 in the second mode, the first clutch 26 is engaged while the engine 12 is started, thereby connecting the engine 12 to the rotor 24 such that torque is transferred from the engine 12 through the first clutch 26 to the electric machine 16.

While the engine 12 is running, the electric machine 16 also has a third mode of operation as a motor. In the third mode, current is provided to the electric machine 16 from the vehicle's batteries or some other source. Instead of connecting the torque generated by the electric machine 16 to the crankshaft of the engine 12, such as in the first mode, the torque generated by the electric machine 16 is connected to the transmission 14 to supplement the power from the engine 12. In the third mode, power generated from both the engine 12 and the electric machine 16 are directed to the transmission 14 of the vehicle. To operate the electric machine 16 in the third mode, both the first and the second clutches 26, 28 are engaged, thereby connecting the engine 12 to the rotor 24 and the rotor 24 to the transmission 14 and an electric current is provided to the electric machine 16 such that the electric machine 16 generates torque which is then transferred through the second clutch 28 to the transmission 14.

Preferably, the first and second clutches 26, 28 are positioned radially within the stator housing 20 and axially within the length of the stator housing 20. Furthermore, one of the first and second clutches 26, 28 is positioned radially within the other of the first and second clutches 26, 28. By mounting the first and second clutches 26, 28 axially within the length of the stator housing 20, and radially within one another, the length of the electric machine 16 does not increase to accommodate the first and second clutches 26, 28. This feature allows the electric machine 16 to be made more compact. The clutches 26, 28 are also preferably mounted radially within the rotor 24, although the invention could be practiced with the first and second clutches 26, 28 mounted radially external of the stator 22. The clutches 26, 28 can be any type of suitable clutch such as hydraulically activated clutches or pneumatically activated clutches.

In the preferred embodiment, a damper 34 is disposed between the engine 12 and the first clutch 26. The damper 34 will soften the engagement of the first clutch 26 to prevent noise and wear on the components of the electric machine 16 when the first clutch 26 is engaged. Referring to FIG. 3, the damper 34 is connected to a shaft 36 which extends from the electric machine. The shaft 36 in connected to the crankshaft of the engine 12. A first intermediate section 38 is connected to the rotor 24. The first clutch 26 is located between the intermediate section and the damper. A second intermediate section 40 is connected to the transmission 14. The second clutch 27 is located between the second intermediate section 40 and the rotor 24.

When the first clutch 26 is engaged, a solid connection is made between the rotor 24 and the engine 12 through the crankshaft, the shaft 36, the damper 34, the first clutch 26 and the first intermediate section 38. When the second clutch 28 is engaged, a solid connection is made between the rotor 24 and the transmission through the second clutch and the second intermediate section 40.

The foregoing discussion discloses and describes one preferred embodiment of the invention. One skilled in the art will readily recognize from such discussion, and from the accompanying drawings and claims, that changes and modifications can be made to the invention without departing from the true spirit and fair scope of the invention as defined in the following claims. The invention has been described in an illustrative manner, and it is to be understood that the terminology which has been used is intended to be in the nature of words of description rather than of limitation.

We claim:

1. An electric machine adapted to be mounted between an engine and a transmission of an automotive vehicle comprising:
   a stator;
   a rotor mounted radially within and coaxial with said stator;
   a first clutch disposed between and interconnecting the engine to said rotor, thereby providing a selectively engageable direct connection between the engine and said rotor;
   a second clutch disposed between and interconnecting said rotor to the transmission, thereby providing a selectively engageable direct connection between the transmission and said rotor;
   said first and second clutches including non-ferrous clutch plates which are adapted to be immersed in hydraulic fluid to wash away debris and to cool said electric machine;
   said electric machine having a first mode of operation as a starter, wherein said electric machine provides torque to the engine to start the engine, a second mode of operation as a generator, wherein said electric machine is driven by the engine and produces electric power, and a third mode of operation as a motor, wherein said electric machine provides torque to the transmission;
   said first and second clutches being positioned radially within said stator housing and axially within the length of said stator housing, one of said first and second clutches being positioned radially within the other of said first and second clutches.

2. The electric machine of claim 1 wherein said first and second clutches are mounted radially within said rotor.

3. The electric machine of claim 1 wherein a damper is disposed between the engine and said first clutch.

4. The electric machine of claim 1 wherein said stator housing is adapted to be mounted within a transmission housing of the transmission.

5. A method of operating a hybrid vehicle comprising:
   providing a hybrid vehicle having an engine and transmission and an electric machine disposed between the engine and the transmission, wherein the electric machine includes a stator, a rotor, a first clutch disposed between and interconnecting the engine to the rotor, thereby providing a selectively engageable direct connection between the engine and the rotor, and a second clutch disposed between and interconnecting the rotor to the transmission, thereby providing a selectively engageable direct connection between the transmission and the rotor, wherein the first and second clutches are positioned radially within a stator housing and axially within the length of the stator housing, one of the first and second clutches being positioned radially within the other of the first and second clutches;
   the electric machine further having a first mode of operation as a starter, wherein the electric machine provides torque to the engine to start the engine, a second mode of operation as a generator, wherein the electric machine is driven by the engine and produces electric power, and a third mode of operation as a motor, wherein the electric machine provides torque to the transmission; and
   selectively engaging the first and second clutches to couple the engine and the transmission to the electric machine.

6. The method of claim 5 including engaging the first clutch to connect the engine to the rotor and providing an electric current to the electric machine to provide starting torque to the engine.

7. The method of claim 5 including engaging the first clutch to connect the engine to the rotor such that the electric machine is driven by the engine and produces an electric current.

8. The method of claim 5 including engaging the second clutch to connect the rotor to the transmission and providing an electric current to the electric machine such that the electric machine provides torque to the transmission.

9. The method of claim 5 including engaging both the first and second clutches to engage the engine to the rotor and the rotor to the transmission.

10. The method of claim 5 wherein the first and second clutches are wet clutches and the first and second clutches and the electric machine are immersed within hydraulic fluid, the method including circulating the hydraulic fluid through the first and second clutches and around the electric machine to flush debris from the clutches and to cool the electric machine.

11. A powertrain for a hybrid vehicle comprising:

an engine;

a transmission;

an electric machine disposed between and interconnecting said engine and said transmission, said electric machine including a stator housing, a stator mounted within said stator housing, a rotor mounted radially within and coaxial with said stator;

said electric machine including a first clutch disposed between and interconnecting said engine to said rotor, thereby providing a selectively engageable direct connection between the engine and said rotor, and a second clutch disposed between and interconnecting said rotor to said transmission, thereby providing a selectively engageable direct connection between the transmission and said rotor, wherein said first and second clutches include non-ferrous clutch plates which are adapted to be immersed in hydraulic fluid to wash away debris and to cool said electric machine, said first and second clutches being positioned radially within said stator housing and axially within the length of said stator housing, one of said first and second clutches being positioned radially within the other of said first and second clutches;

said electric machine having a first mode of operation as a starter, wherein said electric machine provides torque to said engine to start said engine, a second mode of operation as a generator, wherein said electric machine is driven by said engine and produces electric power, and a third mode of operation as a motor, wherein said electric machine provides torque to said transmission.

12. The powertrain of claim 11 wherein said first and second clutches are positioned radially within said stator housing and axially within the length of said stator housing.

13. The powertrain of claim 11 wherein said first and second clutches are mounted radially within said rotor.

14. The powertrain of claim 11 wherein a damper is disposed between the engine and said first clutch.

15. The powertrain of claim 11 wherein said stator housing is adapted to be mounted within a transmission housing of said transmission.

* * * * *